United States Patent
Brennan et al.

(10) Patent No.: US 10,606,893 B2
(45) Date of Patent: Mar. 31, 2020

(54) EXPANDING KNOWLEDGE GRAPHS BASED ON CANDIDATE MISSING EDGES TO OPTIMIZE HYPOTHESIS SET ADJUDICATION

(71) Applicant: International Business Machines Corporation, Armonk, NY (US)

(72) Inventors: Paul E. Brennan, Rush (IE); Scott R. Carrier, Apex, NC (US); Michael L. Stickler, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 15/265,955

(22) Filed: Sep. 15, 2016

(65) Prior Publication Data
US 2018/0075359 A1  Mar. 15, 2018

(51) Int. Cl.
*G06N 5/02* (2006.01)
*G06F 16/901* (2019.01)

(52) U.S. Cl.
CPC ......... *G06F 16/9024* (2019.01); *G06N 5/022* (2013.01)

(58) Field of Classification Search
CPC .................................................. G06F 16/9024
See application file for complete search history.

(56) References Cited

U.S. PATENT DOCUMENTS

| | | | |
|---|---|---|---|
| 5,835,900 A | 11/1998 | Fagg, III et al. | |
| 7,149,756 B1 | 12/2006 | Schmitt et al. | |
| 7,152,065 B2 | 12/2006 | Behrens et al. | |
| 7,430,504 B2 | 9/2008 | Vanderwende et al. | |
| 7,493,333 B2 | 2/2009 | Hill et al. | |
| 7,565,615 B2 | 7/2009 | Ebert | |
| 7,630,947 B2 | 12/2009 | Pandya et al. | |
| 7,752,198 B2 | 7/2010 | Canright et al. | |
| 7,921,031 B2 | 4/2011 | Crysel et al. | |

(Continued)

OTHER PUBLICATIONS

Chris Welty, Query Driven Hypothesis Generation for Answering Queries over NLP Graphs, 2012, International Semantic Web Conference 2012 pp. 228-242.*

(Continued)

*Primary Examiner* — Vincent Gonzales
*Assistant Examiner* — Seth Andrew Raker
(74) *Attorney, Agent, or Firm* — Stephen J. Walder, Jr.; Reza Sarbakhsh

(57) ABSTRACT

Mechanisms are provided in which a first knowledge graph, comprising nodes representing entities and edges between nodes indicative of a relationship between the entities, is received. The mechanisms identify a candidate missing edge connecting a node of the first knowledge graph to another node not present in the first knowledge graph and evaluate the candidate missing edge to determine if the candidate missing edge should be added to the first knowledge graph. The mechanisms expand the first knowledge graph to include the candidate missing edge connecting the node to a newly added node that is newly added to the first knowledge graph, to thereby generate an expanded knowledge graph, in response to the evaluation indicating that the candidate missing edge should be added to the first knowledge graph. The mechanisms then perform an operation on the expanded knowledge graph to generate a knowledge output.

22 Claims, 7 Drawing Sheets

(56) References Cited

U.S. PATENT DOCUMENTS

| | | | |
|---|---|---|---|
| 8,041,743 B2 | 10/2011 | Armstrong et al. | |
| 8,275,803 B2 | 9/2012 | Brown et al. | |
| 8,280,838 B2 | 10/2012 | Ferrucci et al. | |
| 8,370,278 B2 | 2/2013 | Vadlamani et al. | |
| 8,478,769 B2 | 7/2013 | Goldfarb | |
| 8,601,030 B2 | 12/2013 | Bagchi et al. | |
| 8,650,031 B1 | 2/2014 | Mamou et al. | |
| 8,666,730 B2 | 3/2014 | Todhunter et al. | |
| 8,700,620 B1 | 4/2014 | Lieberman | |
| 8,700,621 B1 | 4/2014 | Choi et al. | |
| 8,738,365 B2 | 5/2014 | Ferrucci et al. | |
| 8,738,617 B2 | 5/2014 | Brown et al. | |
| 8,751,578 B2 | 6/2014 | Marcucci et al. | |
| 8,756,245 B2 | 6/2014 | Imielinski et al. | |
| 8,769,417 B1 | 7/2014 | Robinson et al. | |
| 8,942,986 B2 | 1/2015 | Cheyer et al. | |
| 9,037,580 B2 | 5/2015 | Brown et al. | |
| 9,304,672 B2 | 4/2016 | Mital et al. | |
| 9,311,294 B2 | 4/2016 | Allen et al. | |
| 2004/0015869 A1* | 1/2004 | Herriot | G06Q 10/10 717/126 |
| 2004/0193514 A1 | 9/2004 | Kasravi et al. | |
| 2005/0154701 A1 | 7/2005 | Parunak et al. | |
| 2006/0053382 A1 | 3/2006 | Gardner et al. | |
| 2006/0111915 A1 | 5/2006 | Li et al. | |
| 2007/0250502 A1 | 10/2007 | Canright et al. | |
| 2008/0133552 A1 | 6/2008 | Leary | |
| 2008/0208801 A1 | 8/2008 | Friedlander et al. | |
| 2008/0221923 A1 | 9/2008 | Shogan | |
| 2008/0249968 A1 | 10/2008 | Flinn et al. | |
| 2009/0024606 A1 | 1/2009 | Schilit et al. | |
| 2009/0024615 A1 | 1/2009 | Pedro et al. | |
| 2009/0043812 A1 | 2/2009 | Rigdon | |
| 2009/0192968 A1 | 7/2009 | Tunstall-Pedoe | |
| 2009/0287678 A1 | 11/2009 | Brown et al. | |
| 2010/0070448 A1 | 3/2010 | Omoigui | |
| 2010/0280989 A1 | 11/2010 | Mehra et al. | |
| 2011/0040796 A1 | 2/2011 | Shockro et al. | |
| 2011/0066587 A1 | 3/2011 | Ferrucci et al. | |
| 2011/0125734 A1 | 5/2011 | Duboue et al. | |
| 2011/0131244 A1 | 6/2011 | Padovitz et al. | |
| 2012/0078062 A1 | 3/2012 | Bagchi et al. | |
| 2012/0078636 A1 | 3/2012 | Ferrucci et al. | |
| 2012/0078837 A1 | 3/2012 | Bagchi et al. | |
| 2012/0150874 A1 | 6/2012 | Sweeney et al. | |
| 2012/0158742 A1 | 6/2012 | Kulack et al. | |
| 2012/0191684 A1 | 7/2012 | Epstein | |
| 2012/0318866 A1 | 12/2012 | McIntyre et al. | |
| 2013/0006641 A1 | 1/2013 | Brown et al. | |
| 2013/0007055 A1 | 1/2013 | Brown et al. | |
| 2013/0017524 A1 | 1/2013 | Barborak et al. | |
| 2013/0018652 A1 | 1/2013 | Ferrucci et al. | |
| 2013/0066886 A1 | 3/2013 | Bagchi et al. | |
| 2013/0144893 A1* | 6/2013 | Voigt | G06F 16/25 707/754 |
| 2013/0151532 A1 | 6/2013 | Hoyer | |
| 2013/0246321 A1 | 9/2013 | Pandit et al. | |
| 2013/0254182 A1 | 9/2013 | Tunstall-Pedoe | |
| 2013/0254305 A1 | 9/2013 | Cheng et al. | |
| 2013/0268519 A1 | 10/2013 | Cucerzan et al. | |
| 2014/0032378 A1 | 1/2014 | Damnjanovic et al. | |
| 2014/0045163 A1 | 2/2014 | Chen | |
| 2014/0046653 A1 | 2/2014 | Gopalakrishnan et al. | |
| 2014/0057241 A1 | 2/2014 | Rapp et al. | |
| 2014/0087356 A1 | 3/2014 | Fudemberg | |
| 2014/0108095 A1 | 4/2014 | Tetreault et al. | |
| 2014/0149132 A1 | 5/2014 | DeHaan et al. | |
| 2014/0164298 A1 | 6/2014 | Goranson et al. | |
| 2014/0172879 A1 | 6/2014 | Dubbels et al. | |
| 2014/0280353 A1 | 9/2014 | Delaney et al. | |
| 2014/0280952 A1 | 9/2014 | Shear et al. | |
| 2014/0343923 A1 | 11/2014 | Heilman et al. | |
| 2015/0019571 A1 | 1/2015 | Baker et al. | |
| 2015/0227295 A1* | 8/2015 | Meiklejohn | G06F 17/2247 715/823 |
| 2015/0278691 A1 | 10/2015 | Xia et al. | |
| 2015/0325134 A1 | 11/2015 | Candeub et al. | |
| 2015/0379010 A1 | 12/2015 | Allen et al. | |
| 2016/0012119 A1 | 1/2016 | Franceschini et al. | |
| 2016/0140439 A1 | 5/2016 | Adderly et al. | |
| 2016/0140445 A1 | 5/2016 | Adderly et al. | |
| 2016/0140446 A1 | 5/2016 | Adderly et al. | |
| 2016/0140453 A1 | 5/2016 | Adderly et al. | |
| 2016/0147875 A1 | 5/2016 | Adderly et al. | |
| 2016/0148093 A1 | 5/2016 | Adderly et al. | |
| 2017/0124158 A1* | 5/2017 | Mirhaji | G06F 17/274 |
| 2018/0039696 A1* | 2/2018 | Zhai | G06F 16/367 |

OTHER PUBLICATIONS

List of IBM Patents or Patent Applications Treated as Related, Oct. 12, 2016, 2 pages.

"Frequent subtree mining", Wikipedia, accessed from the Internet on Aug. 24, 2016, 3 pages.

"Intelligence Grading Systems", 4Knowledge, http://4knowledge-za.blogspot.com/2009/05/intelligence-grading-systems.html, May 2, 2009, 3 pages.

"MLR3C14000—Appendix 3: The National Intelligence Model (5x5x5)", MLR3C—Money Laundering Regulation: Compliance Manual, HM Revenue & Customs, http://www.hmrc.gov.uk/manuals/mlr3cmanual/mlr3c14000.htm, last updated Aug. 2, 2013, accessed from the Internet on Aug. 18, 2014, 2 pages.

Aldabe, Itziar et al., "Ariklturri: An Automatic Question Generator Based on Corpora and NLP Techniques", ITS Jun. 2006, LNCS 4053, Jun. 26-30, 2006, 11 pages.

Barzilay, Regina, "Graph-based Algorithms in NLP", MIT, Nov. 2005, 57 pages.

High, Rob, "The Era of Cognitive Systems: An Inside Look at IBM Watson and How it Works", IBM Corporation, Redbooks, Dec. 12, 2012, 16 pages.

Hinton, Geoffrey et al., "Lecture 4a, Learning to predict the next word", Neural Networks for Machine Learning, Fall 2015, Accessed from the internet on Aug. 24, 2016, www.cs.toronto.edu/~tijmen/csc321//slides/lecture_slides_lec4.pdf, 34 pages.

Lehmann, Jens et al., "DL-Learner Manual", http://dl-learner.org/Resources/Documents/manual.pdf, Feb. 8, 2016, pp. 1-20.

Lindberg, David et al., "Generating Natural Language Questions to Support Learning On-Line", Long paper from the Proceedings of 14th European Workshop on Natural Language Generation, Sophia, Bulgaria, Aug. 2013, 10 pages.

McCord, M.C. et al., "Deep parsing in Watson", IBM J. Res. & Dev. vol. 56 No. 3/4 Paper 3, May/Jul. 2012, pp. 3:1-3:15.

Molla, Diego , "Learning of Graph-Based Question Answering Rules", Workshop on TextGraphs, at HLT-NAACL 2006, New York City, NY, Jun. 2006, 8 pages.

Nastase, Vivi et al., "A Survey of Graphs in Natural Language Processing", Natural Language Engineering 1(1):1-32, Cambridge University Press, Sep. 15, 2015, 32 pages.

Nastase, Vivi et al., "Matching Syntactic-Semantic Graphs for Semantic Relation Assignment", Workshop on TextGraphs, at HLT-NAACL, Jun. 2006, 8 pages.

Trim, Craig, "NLP-driven Ontology Modeling: The Mechanics and Value of an Ontology Model", IBM developerWorks, IBM Corporation, Nov. 14, 2012, 5 pages.

Trim, Craig, "Ontology-driven NLP", IBM developerWorks, IBM Corporation, May 18, 2012, 3 pages.

Welty, Chris et al., "Query Driven Hypothesis Generation for Answering Queries over NLP Graphs", Lecture Notes in Computer Science, vol. 7650, ISWC 2012, Nov. 2012, 15 pages.

Yuan, Michael J., "Watson and healthcare, How natural language processing and semantic search could revolutionize clinical decision support", IBM developerWorks, IBM Corporation, Apr. 12, 2011, 14 pages.

Ferrucci, et al., "Building Watson: An Overview of the DeepQA Project", Association for the Advancement of Artificial Intelligence, Fall 2010, pp. 59-79.

Getoor, Lise et al., "Link Mining: A Survey", SIGKDD Explorations, vol. 7, Issue 2, Dec. 2005, pp. 3-12.

(56) References Cited

OTHER PUBLICATIONS

Su, Qi et al., "A Research on the Text Reliability Based on Evidentiality", International Journal of Computer Processing of Languages, vol. 23, No. 2, May 2011, pp. 201-214.

Su, Qi et al., "Evidentiality for Text Trustworthiness Detection", Proceedings of the 2010 Workshop on NLP and Linguistics: Finding the Common Ground, Association for Computational Linguistics, ACL 2010, pp. 10-17.

Weichselbraun, Albert et al., "Discovery and Evaluation of Non-Taxonomic Relations in Domain Ontologies", International Journal of Metadata Semantics and Ontologies, Aug. 2009, 10 pages.

\* cited by examiner

EXPANDING KNOWLEDGE GRAPHS BASED ON CANDIDATE MISSING EDGES TO OPTIMIZE HYPOTHESIS SET ADJUDICATION

BACKGROUND

The present application relates generally to an improved data processing apparatus and method and more specifically to mechanisms for expanding knowledge graphs based on candidate missing edges to optimize hypothesis set adjudication.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions which are executed by the at least one processor configure the at least one processor to perform the method. The method comprises receiving, by the data processing system, a first knowledge graph comprising nodes representing entities and edges between nodes. Each edge represents a relationship between the nodes directly connected to each other by the edge. The method further comprises identifying, by the data processing system, at least one candidate missing edge connecting at least one node of the first knowledge graph to at least one other node not present in the first knowledge graph and evaluating, by the data processing system, the at least one candidate missing edge to determine if the at least one candidate missing edge should be added to the first knowledge graph. The method also comprises expanding, by the data processing system, the first knowledge graph to include the at least one candidate missing edge connecting the at least one node to at least one newly added node that is newly added to the first knowledge graph, to thereby generate an expanded knowledge graph, in response to the evaluation indicating that the at least one candidate missing edge should be added to the first knowledge graph. Furthermore, the method comprises performing, by the data processing system, an operation on the expanded knowledge graph to generate a knowledge output.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
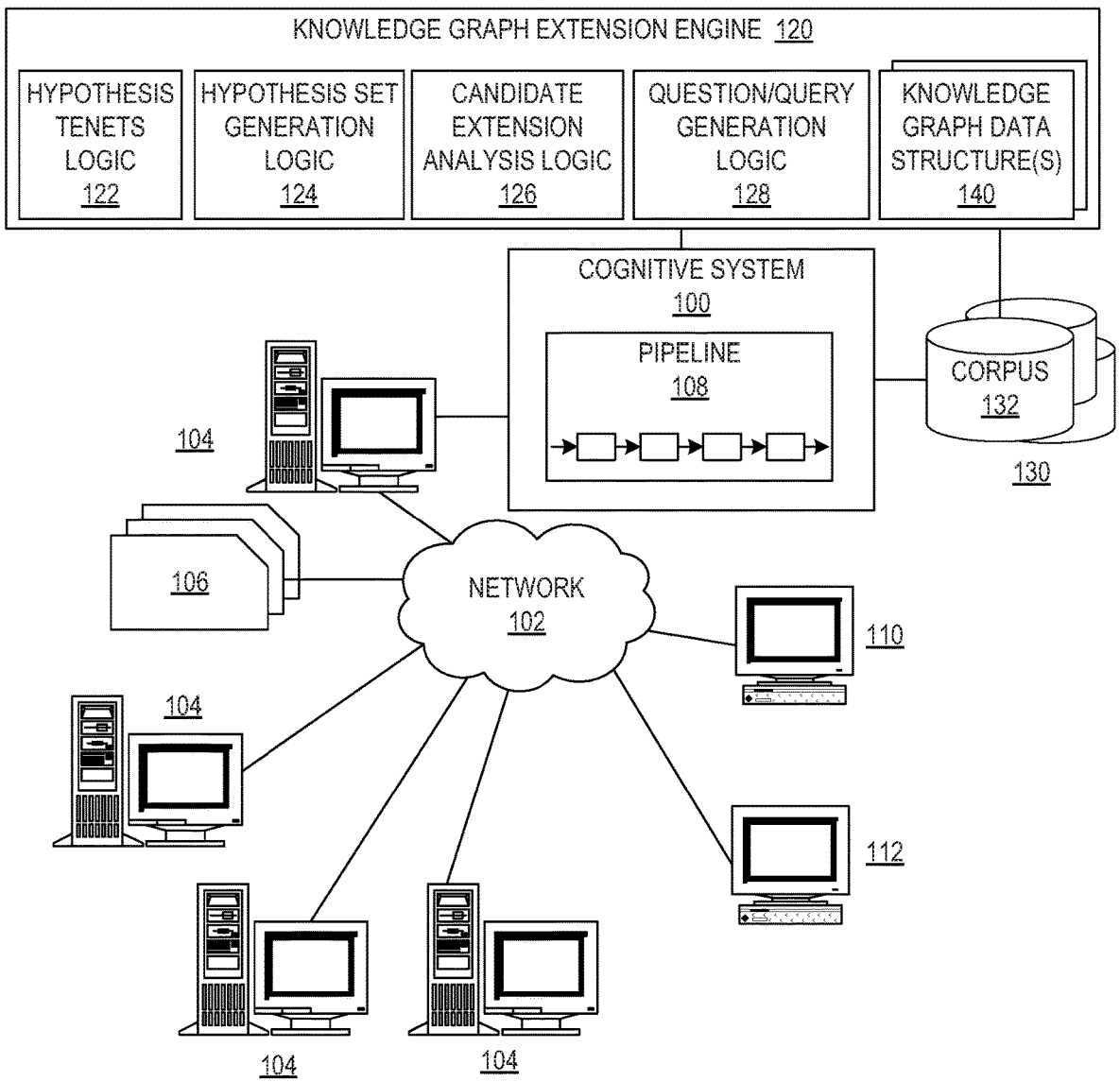
FIG. 1 depicts a schematic diagram of one illustrative embodiment of a question/answer creation (QA) system in a computer network.

Knowledge bases, such as knowledge graphs, enhance a human's ability to query/visualize complex relationships between data entities ingested into the knowledge graph. Humans or computing devices may use the known data to generate a set of hypotheses. For example, in commonly assigned and co-pending U.S. patent application Ser. No. 14/546,417 (Attorney Docket No. AUS920140324US1), entitled "Intelligence Gathering and Analysis Using a Question Answering System," filed Nov. 18, 2014, mechanisms are described for utilizing an ontology, which may be represented as a knowledge graph, to evaluate the entities and their relationships to assist with gathering intelligence about potential hypothetical ontological links between the entities that may not have previously existed within the ontology, and thereby generate a set of hypotheses about the relationships between the entities. This is especially useful in applications where intelligence gathering is a requirement, such as criminal investigations, anti-terrorism intelligence gathering, or the like. Such mechanisms may also be used in other contexts as well, such as medical analysis of patients, disease outbreak detection and investigation, life sciences, or any other context in which relationships between pieces of knowledge may be evaluated. For example, with regard to a life sciences application in which a new drug is being developed, the mechanisms of the illustrative embodiments may assist scientists when developing a new drug by guiding them in their pursuit through prioritizing the process for defining the graph and aiding scientists in supporting the hypotheses of the (un)desired effects of a new drug.

For example, in a criminal investigation context, the knowledge graph may provide a set of known relationships between suspects, witnesses, places, events, and the like, and the mechanisms of the co-pending application may identify other hypothetical relationships between these entities and evaluate those hypothetical relationships with regard to other evidence present in the knowledge graph using complex and cognitive analysis of the other evidence. For example, it may be determined from the knowledge graph or ontology that Paul calls Mary, John calls Paul, and John has been seen at the same location where Mary works. Therefore, using the mechanisms of the co-pending patent application, and the available knowledge within the ontology or knowledge graph, there is a high likelihood that Mary knows John even though the ontology or knowledge graph does not show a relationship between Mary and John.

It should be appreciated that the example names given in this description above and hereafter are intended to be fictitious and any resemblance to any actual persons is strictly coincidental. None of the example scenarios portrayed in this document are actual or based on any actual persons living or dead. The example scenarios are provided merely to help further illustrate the operation of the illustrative embodiments.

While the mechanisms for using knowledge graphs provide the ability to explore knowledge indicated in the knowledge graph, these mechanisms are confined to the knowledge present within the knowledge graph. That is, while analysis may be performed on the knowledge within the graph to extract additional knowledge from the entities and relations represented in the knowledge graph, this analysis is still confined to the information present within the knowledge graph. However, there may be entities/relations outside the knowledge graph that would further prove/disprove one of the elements of a set of hypotheses. For example, using the example above, if there is no information in the knowledge graph for a particular criminal investigation that Mary has been seen at the location where John works, there may be other knowledge graphs that contain this information. Thus, in another knowledge graph there may be information indicating that Mary works at the same location as John. Using this information with the information in the original knowledge graph of the criminal investigation, one would then be given further evidence to prove/disprove the existence of the relationship between Mary and John that Mary knows John.

It can be difficult for humans to identify this additional knowledge outside the knowledge graph or even know what questions/queries would identify such outside knowledge. That is, without knowing that there might be a relationship between Mary and John, it may not be possible to identify John as a potential link to Mary. Moreover, each answer/rules generated based on such questions/queries directed to outside knowledge may generate additional questions/queries that would need to be investigated.

The illustrative embodiments provide mechanisms for expanding a knowledge graph based on the identification of candidate missing edges in order to optimize a hypothesis set adjudication. The illustrative embodiments analyze partial entity/relationships matches associated with entities/relationships in a knowledge graph and entities/relationships in other knowledge graphs to generate a set of candidate questions in natural language for presentation to a human analyst and/or a cognitive system to prove/disprove a set of hypotheses. That is, a corpus of other knowledge graphs is searched for matching patterns of entities and relationships at the edge, or periphery, of the knowledge graph, e.g., tuples of information representing two or more entities and a relationship between the entities may be matched to tuples in other knowledge graphs of the corpus. These matches in patterns of entities are used to identify other edge relationships and entities in other knowledge graphs, which do not exist in the original knowledge graph, and which may be investigated to identify potentially other entities, and relationships with other entities, that may be added to the original knowledge graph. Questions or queries directed to these potential other entities and relationships may then be generated to determine whether, and how, to expand the knowledge graph.

As the questions are answered by the human analyst or cognitive system, the probability of existing hypotheses being correct, e.g., a confidence value for a hypothesis, are recalculated based on the newly acquired entities and relationships indicated in the answers to the questions. In addition, the answers to the set of candidate questions may instigate the generation of new natural language questions that factor in the newly ascertained entities/relationships, which are again presented to the human analyst and/or cognitive system for answering. This process may be repeated until a termination condition is reached where further expansion of the knowledge graph is no longer performed, e.g., confidence values associated with one or more of the hypotheses in the set of hypotheses reach a predetermined threshold level.

In this way, additional knowledge may be added to the knowledge graph which can then be used to prove/disprove hypotheses, provide directed as to additional hypotheses to investigate, and the like. Such mechanisms provide additional insights to individuals and cognitive systems performing operations of intelligence gathering and knowledge expansion, which can then be the basis for other cognitive operations to be performed.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments provide mechanisms for analyzing knowledge graphs, identifying hypotheses based on these knowledge graphs, performing a matching operation of entities/relationships with other knowledge graphs of the same or different knowledge bases, generating candidate missing edges in the present knowledge graph, and presenting and evaluating natural language questions directed to these candidate missing edges. As such, the mechanisms of the illustrative embodiments may be used with, augment, or extend the functionality of cognitive systems or other data processing systems that operate on knowledge graphs or knowledge bases to extract entity relationship information from such knowledge graphs or knowledge bases. The illustrative embodiments extend the knowledge that is generated from such knowledge graphs or knowledge bases by performing cognitive analysis based extensions through matching of entities/relationships between multiple knowledge graphs and/or portions of a knowledge base.

Figure 2:
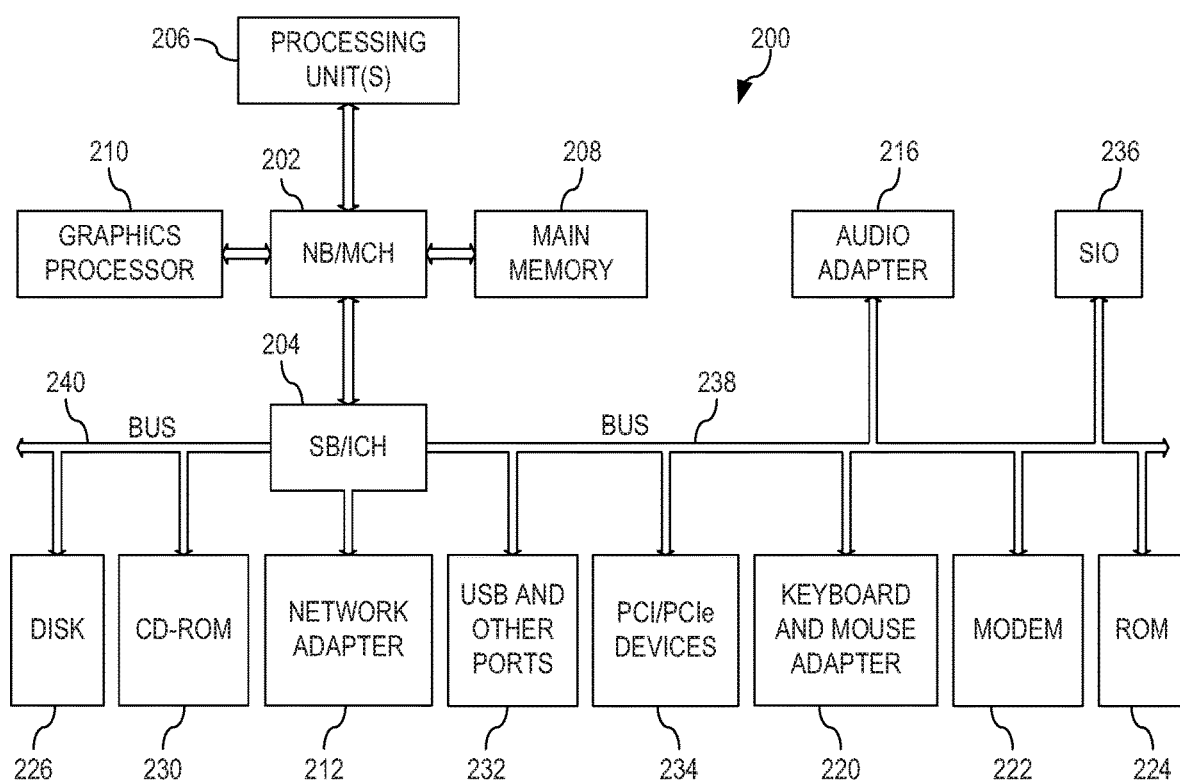
FIG. 2 is a block diagram of an example data processing system in which aspects of the illustrative embodiments are implemented.
Figure 3:
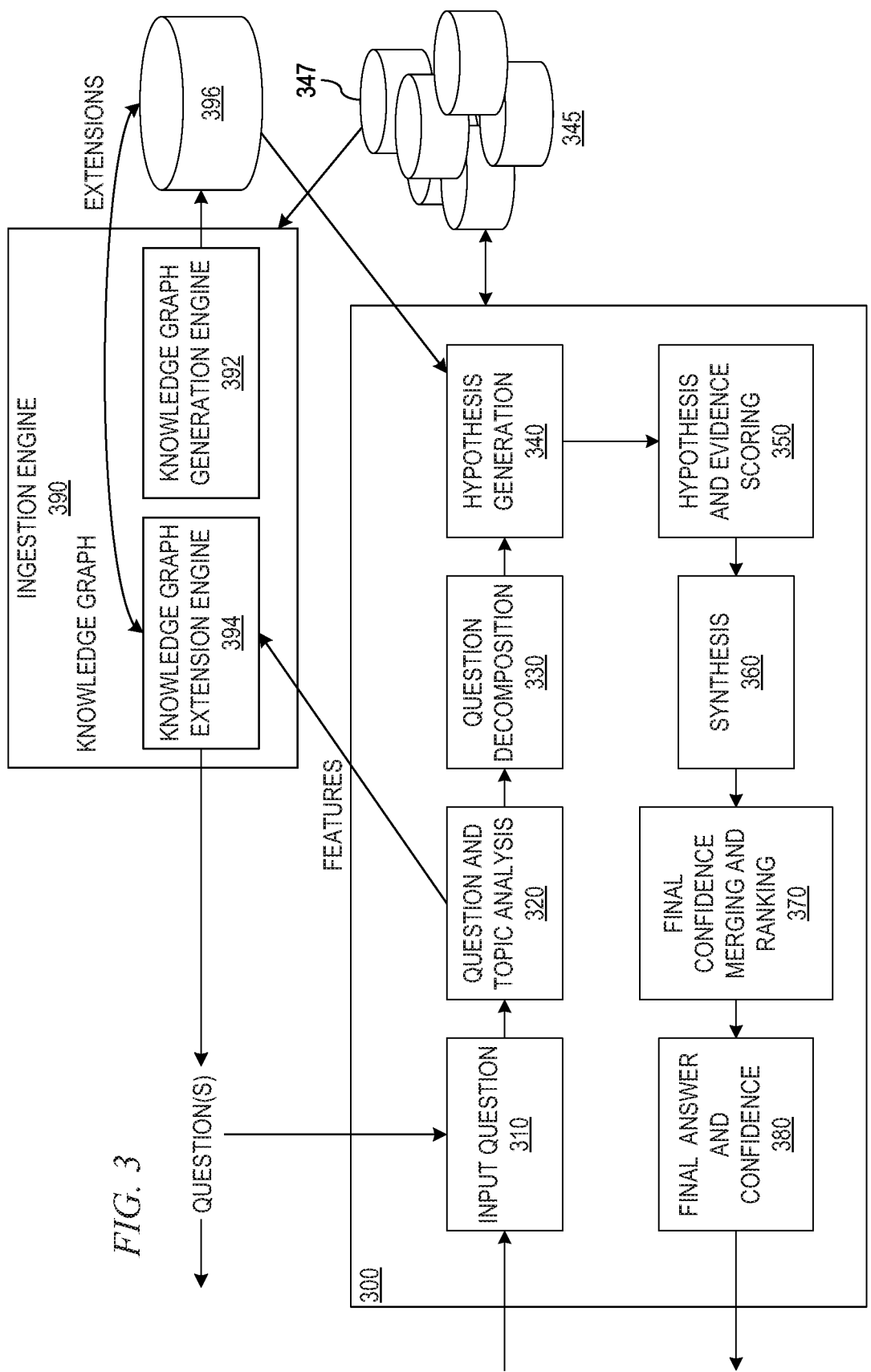
FIG. 3 illustrates a QA system pipeline for processing an input question in accordance with one illustrative embodiment.

Thus, the illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. The QA pipeline is part of a QA system that may be implemented in the cognitive system. The cognitive system, while shown as having a single QA pipeline, may in fact have multiple QA pipelines. Each QA pipeline may be separately trained for answer input questions of a different domains or be configured to perform the same or different analysis on input questions, depending on the desired implementation. For example, in some cases, a first QA pipeline may be trained to operate on input questions in a financial domain while another QA pipeline may be trained to answer input questions in a medical diagnostics domain. Moreover, each QA pipeline may have their own associated corpus or corpora that they ingest and operate on, e.g., one corpus for financial domain documents and another corpus for medical diagnostics domain related documents in the above examples. In some cases, the QA pipelines may each operate on the same domain of input questions but may have different configurations, e.g., different annotators or differently trained annotators, such that different analysis and potential answers are generated. The QA system may provide additional logic for routing input questions to the appropriate QA pipeline, such as based on a determined domain of the input question, combining and evaluating final answers generated by multiple QA pipelines, and other control and interaction logic that facilitates the utilization of multiple QA pipelines.

As will be discussed in greater detail hereafter, the illustrative embodiments are integrated in, augment, and extend the functionality of these QA mechanisms of the cognitive system with regard to identifying and evaluating hypotheses for analysis, extending the knowledge graphs and/or knowledge bases upon which the QA mechanisms operate, and generating new input questions that may be evaluated by the QA mechanisms based on the extended knowledge graphs and/or knowledge bases.

Thus, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a processing pipeline 108, which may be a request processing pipeline 108 or, in some illustrative embodiments, an input question answering (QA) pipeline 108 in a computer network 102. For purposes of the following description, it will be assumed that the pipeline 108 is a QA system pipeline 108. One example of a question processing and answer generation operation that may be performed by such a QA system pipeline 108 is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, sub-systems, and/or devices other than those that are depicted herein.

The cognitive system 100 is configured to implement the pipeline 108, which hereafter will be referred to as QA pipeline 108 using the QA system pipeline as an example, which receives inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a knowledge graph extension engine 120 which operates on one or more knowledge graphs 140 generated from information present in one or more corpora of data 130. The knowledge graph data structures 140, as well as the data in the one or more corpora 130 from which the knowledge graph data structures 140 are generated, may represent various entities and relationships between entities depending upon the particular implementation of the illustrative embodiments. The knowledge graph extension engine 120 takes an original knowledge graph, identifies entities/relationships present in that knowledge graph which may represent areas where the knowledge graph may be extended with regard to a set of hypotheses generated based on the knowledge graph, e.g., portions of the knowledge graph at a periphery of the knowledge graph, and then performs matching on these entities/relationships with other knowledge graph data structures 140 and/or portions of data in the one or more corpora 130. Based on this identification, evaluation of the candidate extensions is performed and, if there is sufficient confidence to include the additional candidate extension to the original knowledge graph, the knowledge graph data structure is extended to include the candidate extension. This may result in additional hypotheses or questions/queries to be evaluated by the cognitive system 100 which can then feed back into the knowledge graph extension engine 120.

It should be appreciated that the term "entity" as it is used herein refers to any person, place, thing, event, or the like, which may physically or virtually exist. Entities are typically described in terms of nouns. Entities may have particular types, referred to herein as an "entity type", which generally correlates a specific instance of an entity to a more general category of entities, e.g., John Smith has an entity type of "person", "employee", "suspect", "witness", "patient", "medical professional", or the like. A specific instance of an entity may have multiple different entity types depending upon the particular implementation. Thus, John Smith may, in one knowledge base and corresponding knowledge graph, have entity types of "person" and "suspect", for example.

Entities have associated relationships with other entities in a knowledge base or knowledge graph. Individual instances of these relationships may also be associated with more general categories or types of relationships (relationship types) such as "knows", "works with", "calls", "visits", "lives with", "is related to", "is a", etc. Thus, in a knowledge base and/or knowledge graph, there may be a "knows" relationship between the entities "John Smith" and "Mary Jones".

In a knowledge graph representation of a portion of a knowledge base, entities are often represented as nodes with attributes, while relationships between entities are represented by arcs between the nodes. The particular entities and their relationships may be further represented as data tuples that indicate the particular entities and their relationship, e.g., {entity A, entity B, relationship} or, in the above example, {John Smith, Mary Jones, knows}. Such tuples, the various entity and relationship types, and other attributes may be stored in association with the nodes representing the instances of entities. Thus, for a node representing John Smith, the tuple above may be included in the attributes of the node along with the entity and relationship types. Of course any representation of relationships between entities may be used without departing from the spirit and scope of the illustrative embodiments, this is but one example for illustration purposes only.

The knowledge graph extension engine 120 comprises hypothesis tenets logic 122 which provides interfaces and data structures that allow subject matter experts (SMEs) to establish the tenets for generating hypotheses from data present in one or more knowledge bases and/or knowledge graphs. The tenets represent the definition of rules indicative of elements that together constitute a hypothesis for answering a particular inquiry. For example, in a criminal investigation implementation, the tenets may comprise rules for evaluating motive, means, and opportunity. The rules may be expressed as tuples that serve to prove or disprove the hypothesis. For example, a tuple of person A knows the victim is a rule that is indicative of proving a hypothesis that person A may have a motive (tenet) to have performed the criminal act against the victim. On the other hand, a tuple that person A was in a remote location from where the crime occurred, e.g., {person A, location of crime, not near}, is disproving of the hypothesis that person A may have had the opportunity (tenet) to perform the criminal act against the victim.

SMEs establish these tenets and their corresponding rules or tuples, for the particular hypotheses that the SMEs are looking to generate from a knowledge base or knowledge graph. Thus, if the SME determine that, again using a criminal investigation context, a hypothesis they wish to explore is of the type "[Person A] committed the [criminal activity] against [victim]" then the tenets that the SME may define include, potentially among others, motive, means, and opportunity. For each of these tenets, the SME may further define a first set of tuples that are indicative of the hypothesis being correct (prove the hypothesis), and a second set of tenets that are indicative of the hypothesis not being correct (disprove the hypothesis). It should be appreciated that the particular hypotheses, corresponding tenets, and their corresponding sets of tuples are domain specific, with the example domain being used herein for explanatory purposes being a criminal investigation domain. Other domains and corresponding hypotheses, tenets, and tuples may be used without departing from the spirit and scope of the illustrative embodiments. The definition and storage of such tenets is performed via the hypothesis tenets logic 122.

Using the hypotheses and their corresponding tenets and sets of tuples, the hypothesis generation logic 124 operates on a given knowledge graph data structure 140 to generate a set of hypothesis instances for the particular set of data represented by the knowledge graph data structure 140. The generation of knowledge graphs data structures from a set of data is generally known in the art and thus, a more detailed explanation of such is not presented herein. Suffice it to say that the knowledge graph extension engine 120, or other logic not shown in FIG. 1, operates on the data present in the corpora 130 to generate one or more knowledge graphs representing entities as nodes and relationships between entities as arcs between nodes. The nodes may have attributes including one or more tuples that represent the relationships of the entity corresponding to the node with one or more other entities in the knowledge graph data structure(s) 140. These entities and relationships have types as noted above.

A user, e.g., a user of client computing device 110, may submit an input question or request to the cognitive system 100 via network 102 and server 104, for example. The input question or request may target a particular collection of data represented by the corpus 132 and its corresponding knowledge graph data structure 140. For example, the corpus 132 may comprise the data gathered from a particular criminal investigation, or "case". Other corpora 130 may comprise data and corresponding knowledge graph data structures 140 for other criminal investigations or "cases". Thus, via the input question or request, an original knowledge graph data structure 140, hereafter referred to as the "case knowledge graph," is identified in the set of knowledge graph data structures 140 comprising other case knowledge graphs for other cases. Again, these examples are using a criminal investigation domain as an example and one of ordinary skill in the art, in view of the present description, will see correlations to other domains, such as medical investigations, insurance investigations, financial analysis, etc.

In addition, based on the question or request received, the cognitive system 100, as part of its processing to generate an answer to the input question or request, may invoke the operation of the knowledge graph extension engine 120 to perform its operations for extending the case knowledge graph 140 and presenting automatically generated questions/queries, as well as potentially a representation of the extended knowledge graph with extensions accentuated, to the requesting user via the client computing device 110 and/or the cognitive system 100 for automated cognitive analysis. For example, a user may input an input question or request of the type "Who are suspects in the murder of Jane Smith?" or "Identify suspects in the murder of Jane Smith." The pipeline 108 of the cognitive system 100 may perform initial processing on the request/question, which may be provided as a natural language input or structured input, to extract the main features of the request/question and generate queries that are applied to the corpus 130 to generate candidate answers to the request/question. As part of the candidate answer generation, the pipeline 108 logic and/or other logic of the cognitive system 100 may instigate operation of the knowledge graph extension engine 120 to assist with candidate answer generation.

In response to an instigation request from the cognitive system 100, the knowledge graph extension engine 120 retrieves the case knowledge graph 140 corresponding to the question/request, e.g., a case identifier may be specified in the request/question, correlation based on victim's name may be performed, or any other methodology for identify which case knowledge graph corresponds to the request/question may be performed. In addition, based on the features extracted from the request/question, the type of investigation being performed, or focus of the question/request, may be identified. For example, in the above example questions/requests, the type of investigation is a "murder." This indicator of the type of investigation being performed may be used by the hypothesis tenets logic 122 to correlate to a particular set of hypotheses, tenets, and corresponding tuples, in a set of predefined hypotheses/tenets, which are associated with the type of investigation, e.g., "murder" investigation. This allows for different sets of hypotheses/tenets to be defined for different types of investigations or focus of questions/requests.

The tenets for the various retrieved hypotheses are applied by the hypothesis set generation logic 124 to the case knowledge graph 140 to thereby generate individual instances of the hypotheses. That is, tuples in the case knowledge graph 140 are analyzed to determine if there are matches with the tuples corresponding to the tenets for the retrieved hypotheses. Matching tuples are used to weight the probability of a support basis for the corresponding hypothesis being present in the case knowledge graph 140. For example, a tenet of "motive" for a murder investigation that is supportive of the hypothesis that person C murdered person A, may indicate a rule comprising the tuples {person A, person B, had affair with} and {person A, person B, spouse}. If the knowledge graph has a tuple of {John Jones, Mary Smith, had affair with} and another tuple of {John Jones, Candace Jones, spouse}, then the tenet is matched and there is support for the hypothesis that Candace Jones (person C) murdered John Jones (person A). Additional tenets may indicate other types of tuples that may be supportive (proving of) or unsupportive (disproving of) the hypothesis, and these will all be weighted according to an established weighting, e.g., basic summation, relative importance weighting, or any other functionality for weighting the relative importance of the tuples to supporting/not supporting the hypothesis, to thereby generate a value indicative of whether the hypothesis should be included in a set of hypotheses for further analysis. Thus, in the example above, a hypothesis of "Candace Jones murdered John Jones" with the motive of infidelity is generated.

The tuples in the knowledge graph that are supportive/not supportive of the hypothesis are used by the hypothesis set generation logic 124 to generate a sub-knowledge graph that represents the portion of the case knowledge graph that corresponds to the hypothesis. This sub-knowledge graph represents the knowledge present in the case knowledge graph that is useful in evaluating the hypothesis. However, as noted above, there may be other evidence that is outside of the case knowledge graph 140 that may be able to provide additional support or refute the hypothesis. The candidate extension analysis logic 126 performs operations to attempt to find these possible extensions of the case knowledge graph.

In order to extend the case knowledge graph based on the identified hypotheses, the candidate extension analysis logic 126 determines the entity and relationship types associated with the tuples in the sub-knowledge graph of the particular hypothesis and attempts to match the sub-knowledge graph to portions of other knowledge graphs 140, such as other case knowledge graphs for other cases. In the above hypothesis for example, the entity types for Candace Jones may be person, spouse, and suspect and the entity types of John Jones may be person, spouse, and victim, while the entity types for Mary Smith may be person and mistress. The relationship type between Candace Jones and John Jones may be "married to", the relationship type between John Jones and Mary Smith may be "had affair with", and the relationship type between Candace Jones and Mary Smith may be a hypothetical relationship type of "murdered."

These entity types and relationship types of the sub-knowledge graph for the hypothesis are matched to similar patterns of entity types and relationship types in other knowledge graphs 140 to determine if there are partial matches, i.e. the pattern is present in one or more of the other knowledge graphs 140 with potentially other entities and relationships also being present within these knowledge graphs 140. For example, it may be determined that in other cases where the spouse of the victim murdered the victim because of an affair with a mistress, there are other relationships between the spouse and another person who was hired to perform the murder. While such a relationship may not be present in the current case knowledge graph, the current case knowledge graph may be extended to look for similar relationships between, for example, Candace Jones and other individuals to determine if there is a possibility that Candace Jones hired another person to perform the murder of John Jones. Essentially, the matching process performed by the candidate extension analysis logic 126 attempts to find portions of other knowledge graphs, and thus other portions of the corpora 130 or knowledge base, that have a similar pattern of entity types and relationship types to those set forth in the tuples of the sub-knowledge graph corresponding to the hypothesis.

It should be appreciated that there are a variety of techniques that may be used to match sub-knowledge graphs and/or the underlying tuples to portions of other knowledge graphs or other portions of the knowledge base, i.e. corpora 130. For example, explicit matching in which two entities of the same type are linked by the same relationship type may be identified. Moreover, a variety of implicit matching techniques may be used. For example, entities of different types may be linked by the same relationship type, but the entities have a "is a" relationship between the entities found in the hypotheses, e.g., "IBM" (entity) "is a" (relationship) "corporation" (entity) would match a similar relationship with "Microsoft" which "is a" "corporation". Also, derived relationship matches may be utilized as well, e.g., Person C is a "child of" Person A with Person A "married to" Person B, such that the derived relationship is that Person C is a "child of" Person B. Other types of explicit and implicit matching techniques of relationship and entity types, of more or less complexity, may be performed by the candidate extension analysis logic 126 to identify portions of other knowledge graphs that match the sub-knowledge graph of the hypothesis. For example, frequent sub-tree mining techniques that learn from positive and negative examples and find patterns that are frequently found in one set but not the other, may be utilized. Also, mechanisms such as DL-Learner may be used in which neural networks are trained to predict facts given a knowledge base may be utilized to assist with performing sub-knowledge graph matching.

Having found one or more matches in other knowledge graphs 140, each matching portion of the other knowledge graphs is analyzed by the candidate extension analysis logic 126 to identify edge nodes of the matching portion and the nodes with which they have a relationship that are not part of the matching portion, i.e. nodes in the other knowledge graphs that are not in the sub-knowledge graph which are matched. Thus, for example, the sub-knowledge graph may have nodes representing John Jones, Mary Smith, and Candace Jones with the corresponding relationships as noted above. This sub-knowledge graph is matched to a portion of another knowledge graph for another case in which entities of Mark Miller, Jane Doe, and Betty Miller are present in a matching portion of the other knowledge graph such that Mark Miller, Jane Doe, and Betty Miller have similar relationships to that of the current sub-knowledge graph, potentially involving more complex analysis identify direct/indirect relationships as discussed above. However, an additional relationship between Betty Miller and another person, Garrett Allen, is present in the other knowledge graph with a relationship of Betty Miller having "paid" Garrett Allen and Garrett Allen having a relationship with Mark Miller of having "murdered" Mark Miller. Thus, in this other case knowledge graph, there is an additional entity node with corresponding relationships that are not present in the sub-knowledge graph corresponding to the hypothesis for the current case knowledge graph. The types of entities and types of relationships for these additional entity nodes and relationships in the other knowledge graph may be used to generate additional questions/queries for extending the current case knowledge graph. For example, in this scenario, an additional question/query may be whether Candace Jones had a financial relationship with another person or not and whether that other person had a relationship with the victim.

The identification of additional nodes and relationships that are present within other knowledge graphs and which are coupled to the matching portion via edge nodes, essentially identifies candidate missing edges and corresponding additional entity nodes for evaluation as to whether similar missing edges and nodes should be added to the current case knowledge graph. Thus, for example, a candidate missing edge in the above example may be a "paid" relationship or a financial relationship between Candace Jones and another person, e.g., Person D, which may be represented as the tuple {Candace Jones, Person D, paid (or financial)}. A listing of all the other potential candidate edges, or tuples, found in each of the other knowledge graphs that matched the sub-knowledge graph corresponding to the hypothesis, may be compiled by the candidate extension analysis logic 126 and evaluated based on their features to determine a relative ranking of the candidate missing edges to further analyze. The features considered as well as the relative ranking of these features is implementation specific but may include various features found in the entity relationships of the other knowledge bases. Examples of such features include, but are not limited to, evidential weighting ascribed to the entity relationship with regard to proving/disproving a hypothesis in the case associated with the other knowledge graph, user feedback regarding the relationships found to be most convincing of the final outcome of the case, e.g., jury feedback as to what they found most compelling and dispositive of their final jury decision, a degree of sub-graph matching indicated by a score value, e.g., how many nodes and edges were directly matched as opposed to indirectly matched, frequency of occurrence of the particular relationship and entity types across knowledge graphs, conviction/exoneration ration of the knowledge graphs in which the sub-knowledge graph was matched, etc.

A predetermined number of the higher ranking candidate missing edges are selected for further evaluation by the question/query generation logic 128. For example, the top N ranked candidate missing edges, e.g., top 10 ranked candidate missing edges, may be selected for further evaluation. The question/query generation logic 128 may then generate questions/queries directed to a known entity node in the sub-knowledge graph using the relationship type and entity type for the missing edge. For example, a question or query may be of the type "Did anyone [PERSON]/[FAMILY_MEMBER]/[CLOSE_ACQUAINTANCE]/[COLLEAGUE] threaten Sarah Bell [VICTIM]?" where elements shown in capital letters inside brackets represent the entity types of the entities in the candidate missing edge being evaluated. In the simplified example scenario previously presented, a question/query may be of the type "Did anyone [PERSON] get paid [PAID] by Candace Jones [SUSPECT]?"

The questions/queries generated by the question/query generation logic 128 may be output to the user via the client computing device 110 for guiding the user in how to further investigate the case. Thus, in some illustrative embodiments, the cognitive system 100 may operate as a mechanism by which the user extracts additional knowledge from the corpora 130 and guides the user as to what questions/queries to further investigate. The output of the question/queries to the user may be performed via a graphical user interface through which the user may enter an answer to the question/query which is then added to the corpus 132 for the case and may initiate a subsequent iteration of the operation of the knowledge graph extension engine 120. Thus, for example, in response to the question "Did anyone get paid by Candace Jones?", the user may answer the question by entering the name "Jim Moore" indicating that, based on the user's knowledge, Jim Moore is a person that was paid by the suspect, Candace Jones and may potentially be a person of interest to the investigation.

The questions/queries may be generated in a hierarchical manner based on the identification of the missing edges and the answers to questions/queries provided by the user. For example, if the user responds that Jim Moore was a person that was paid by the suspect, then a subsequent question/query generated based on the additional nodes identified in other knowledge graphs may be "Did Jim Moore murder John Jones?" This question may not be able to be answered by the user, but may give the user additional entities and relationships to further investigate.

In addition to, or alternative to, the output of questions/queries to the user via the client computing device 110, the questions/queries may be provided as input to pipeline 108 of the cognitive system 100 for processing. The pipeline 108 may process the input question/query to generate candidate answers to the question/query, find supporting evidence for the candidate answers from the corpora 130, rank the candidate answers according to confidence scoring based on the supporting evidence, and outputting a final answer to the input question/query. The final answer output by the pipeline 108 may be added to the case knowledge graph 140 for the case as an additional node or nodes and relationship edge(s). This may instigate a subsequent iteration of the knowledge graph extension engine 120 based on the newly extended case knowledge graph.

The iterative process may be performed until a stopping point is reached, e.g., no further nodes and edges are added to the case knowledge graph. This iterative process may favor immediate or direct candidate edges which are the edges that have a relationship with known entities in the original case knowledge graph. In subsequent iterations, edges that have indirect or non-immediate candidate edges with a known entity in the original case knowledge graph may be evaluated. In this way, as questions/queries are generated and answered with each iteration, progression is made out to a next outer layer of edges having more indirectness to the original case knowledge graph.

In some illustrative embodiments, the extended case knowledge graph may be output to the user via client computing device 100 for further consideration by the user. The output of the extended case knowledge graph may represent the extensions in a visually emphasized, or less emphasized, manner in relation to the graphical representation of the original case knowledge graph such that the user can distinguish those portions of the final case knowledge graph that were originally present and those that were added by extension and operation of the knowledge graph extension engine 120. The graphical representation of the final case knowledge graph may be able to be interacted with by the user via a user interface such that portions of the final case knowledge graph may be drilled down into to obtain more detailed information regarding the entities and relationships between the entities. For example, portions of the corpus 132 may be linked to the entities and relationships, such as witness reports, telephone logs, etc., that are a basis for determining that the relationship between the entities exists.

It should also be appreciated that while the knowledge graph extension engine 120 is shown as a separate entity from cognitive system 100 in FIG. 1 for illustration purposes, the knowledge graph extension engine 120, or portions of the knowledge graph extension engine 120, may in fact be integrated into the cognitive system 100. For example, various ones of the logic elements 124-128 may be integrated into one or more logic stages of the pipeline 108, such as a hypothesis generation stage or query generation stage of the pipeline 108, as discussed hereafter. Thus, the knowledge graph extension engine 120, or individual elements of the knowledge graph extension engine 120, may be part of, or separate from, the cognitive system 100 without departing from the spirit and scope of the illustrative embodiments.

In view of the above, it can be seen that the mechanisms of the illustrative embodiments extend the knowledge that may be obtained from a corpus or corpora with regard to individual knowledge graph data structures 140. It can be appreciated that there may be large amounts of data present in the corpus 132 or corpora 130 which may make it difficult to identify particular entities and relationships that are relevant to a particular investigation. Thus, the mechanisms of the illustrative embodiments provide automated tools for extending a knowledge graph for a particular investigation based on knowledge present in a knowledge base (corpus or corpora) by performing partial matching of knowledge graphs, where the partial matching is with regard to a sub-knowledge graph corresponding to the particular hypothesis being investigated.

To illustrate this operation further, consider an example in which the mechanisms of the illustrative embodiments are used to represent a traditional evidence board of a criminal investigation as a knowledge graph data structure. That is, based on initial evidence gathering by law enforcement individuals at a crime scene, a data is entered into a corpus 132 which results in a knowledge graph data structure 140 for the case being generated. This knowledge graph data structure 140 is similar to an evidence board in which entities, e.g., witnesses, suspects, events, locations, items, and the like, are linked together via relationships.

Using the mechanism of the illustrative embodiments, this initial evidence board representation as a knowledge graph is analyzed to generate one or more hypotheses for investigation and the corresponding sub-knowledge graph, or portion of the evidence board, is matched elsewhere with other case evidence boards (other knowledge graphs) to generate a set of weighted/prioritized candidate missing edges, e.g., set of other entities and relationships to further pursue with investigation. These prioritized candidate missing edges are converted to natural language questions which can be posed to a human being (e.g., law enforcement officer) or a cognitive system, such as a QA system. As the generated questions generated from the candidate missing edges are answered, some candidate edges will be disproved, while other new edges may be generated through newly discovered matches from which the new candidate relations are generated.

Noise is filtered in the illustrative embodiments based on the prioritization of questions that are linked to known entities in the original case knowledge graph and the recalculation of candidate edges as each generated question/query is answered. The iterative operation starts with direct or immediate relationships with a known entity in the original case knowledge graph and/or sub-knowledge graph of the hypothesis, e.g., a specific person, place, or thing, for the purpose of asking a more specific question/query and attempting to avoid more open-ended questions/queries. As questions/queries are answered and missing edges are identified, the next set of questions/queries are posed until a stopping point is reached, e.g., all the missing edges are added and/or identify enough evidence to pass the threshold of proof for the hypothesis set.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the pipeline 300 operates, at least in part, based on knowledge graph data structures 396 that represent knowledge extracted from the corpus or corpora 345, 347, i.e. entities and their relationships. An initial set of knowledge graphs 396 may be generated by analysis of the corpus or corpora 345, 347 via the knowledge graph generation engine 392. The generation of such a knowledge graph data structure 396 may be performed at any point in time, but in some illustrative embodiments is done as part of an ingestion operation performed by the ingestion engine 390 as part of a configuration or initialization operation of the QA system pipeline 300. The ingestion operation generates an in-memory representation of the knowledge present in the corpus or corpora 345, 347.

In addition, the pipeline 300 further comprises logic, such as in the question and topic analysis stage 320 logic, for providing the features of the input question 310 to the knowledge graph extension engine 394 to initiate its operations with regard to a specified knowledge graph data structure. That is, the logic provides features, which may include an identifier of the knowledge graph data structure 396, either explicitly or through identification of a particular entity associated with the knowledge graph data structure, which identify the particular knowledge graph to which the input question 310 is directed. The features may further include indicators of the focus or nature of the question being asked which can be correlated to a set of hypotheses, tenets, and tuples that are the types of investigations being performed and serve to extend the knowledge base identified in the features. The knowledge graph extension engine 394 operates as previously described above to analyze the knowledge graph to identify sub-knowledge graphs corresponding to instances of hypotheses, match the sub-knowledge graphs to other knowledge graphs 396, and generate questions/queries to be output to a user and/or to the QA system pipeline 300 for further answering. This process may be performed repeatedly with extensions to the knowledge graph being stored as an extended knowledge graph 396.

Figure 4:
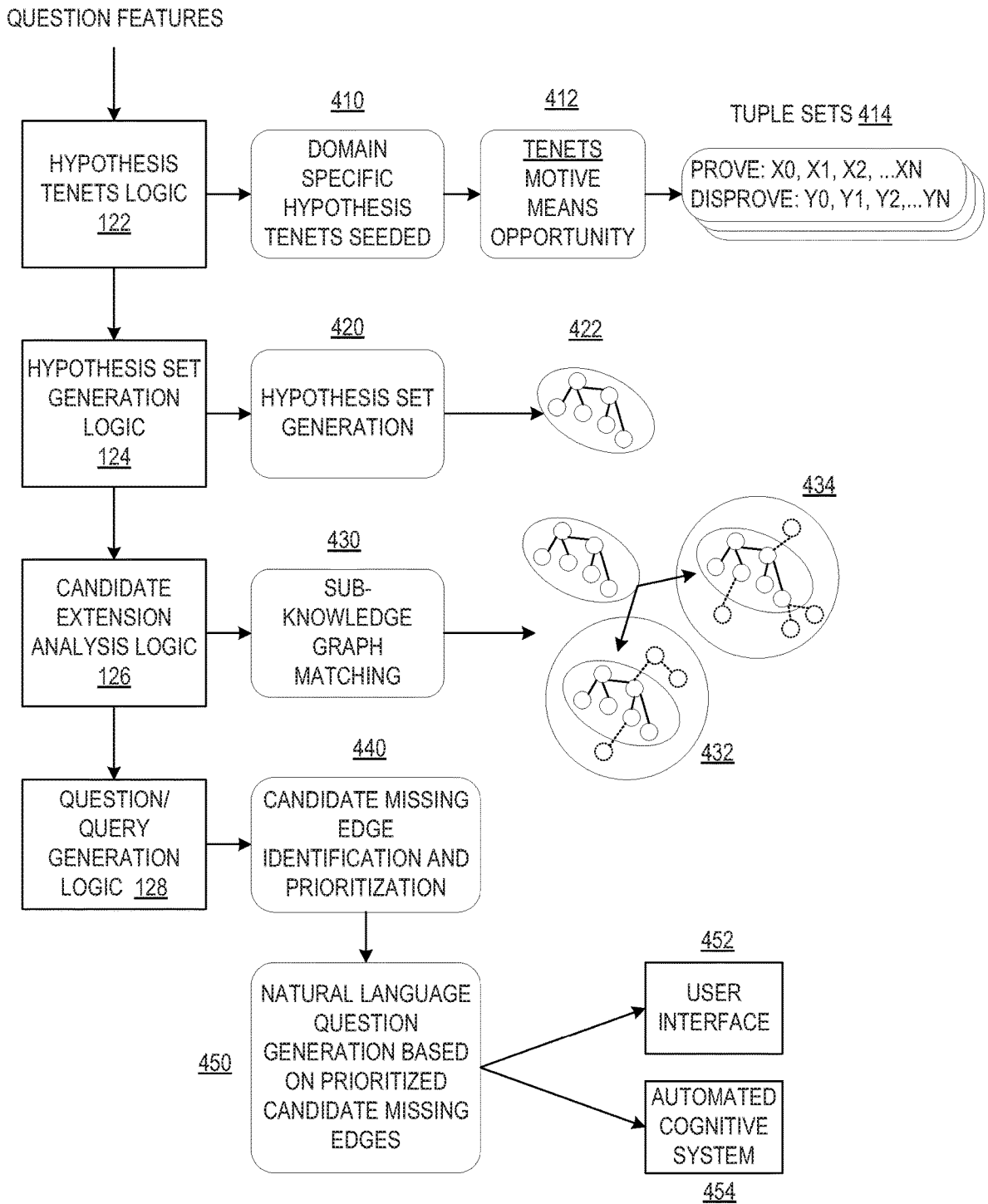
FIG. 4 is an example diagram further illustrating a flow of operations and correlation to the logic elements of the knowledge graph extension engine in accordance with one illustrative embodiment.

FIG. 4 is an example diagram further illustrating a flow of operations and correlation to the logic elements of the knowledge graph extension engine in accordance with one illustrative embodiment. As shown in FIG. 4, as a first set of operations, in response to receiving an inquiry having question features indicative of the knowledge graph that is the subject of the inquiry and the purpose or focus of the inquiry, the hypothesis tents logic 122 identifies the domain specific hypotheses for the focus of the inquiry 410, which in turn identifies the corresponding tenets 412 and their associated tuple sets 414. These hypotheses 410, tenets 412, and tuple sets 414 are applied to the knowledge graph corresponding to the question features by the hypothesis set generation logic 124 as part of a hypothesis set generation operation 420. For a particular hypothesis, one or more instances of sub-knowledge graphs 422 are generated from the specific original knowledge graph. The sub-knowledge graph 422 is then used by the candidate extension analysis logic 126 to perform a sub-knowledge graph matching operation 430 with other knowledge graphs 432, 434 of a knowledge base, e.g., a corpus or corpora. The matching identifies parts of these other knowledge graphs 432, 434 that match the sub-knowledge graph 422 and thus, represents a partial matching operation.

As shown in FIG. 4, the knowledge graphs 432, 434 may have additional nodes that have edges coupled to a node in a matching portion of the knowledge graph 432, 434 that matches the sub-knowledge graph 422. These edges constitute candidate missing edges in the original knowledge graph referenced by the question features. These candidate missing edges are identified by the question/query generation logic 128 and prioritized 440 based on features of these nodes and corresponding candidate missing edges and pre-established criteria, weightings, and the like. The resulting prioritized candidate missing edges are then converted to natural language questions 450 which are output to either, or both, of a user interface 452 and/or automated cognitive system 454.

As mentioned above, this may be an iterative process in which a user may provide an answer to the natural language question output via user interface 452 which is fed back into the system such that the answer is added to the knowledge graph and the process repeated. Similarly, the automated cognitive system 454 may generate an answer through automated means and provide that answer back to the system where it is added to the knowledge graph and the process repeated. In this way, the knowledge graph is iteratively extended to identify additional potential pieces of knowledge that expand upon the original knowledge graph.

Figure 5A:
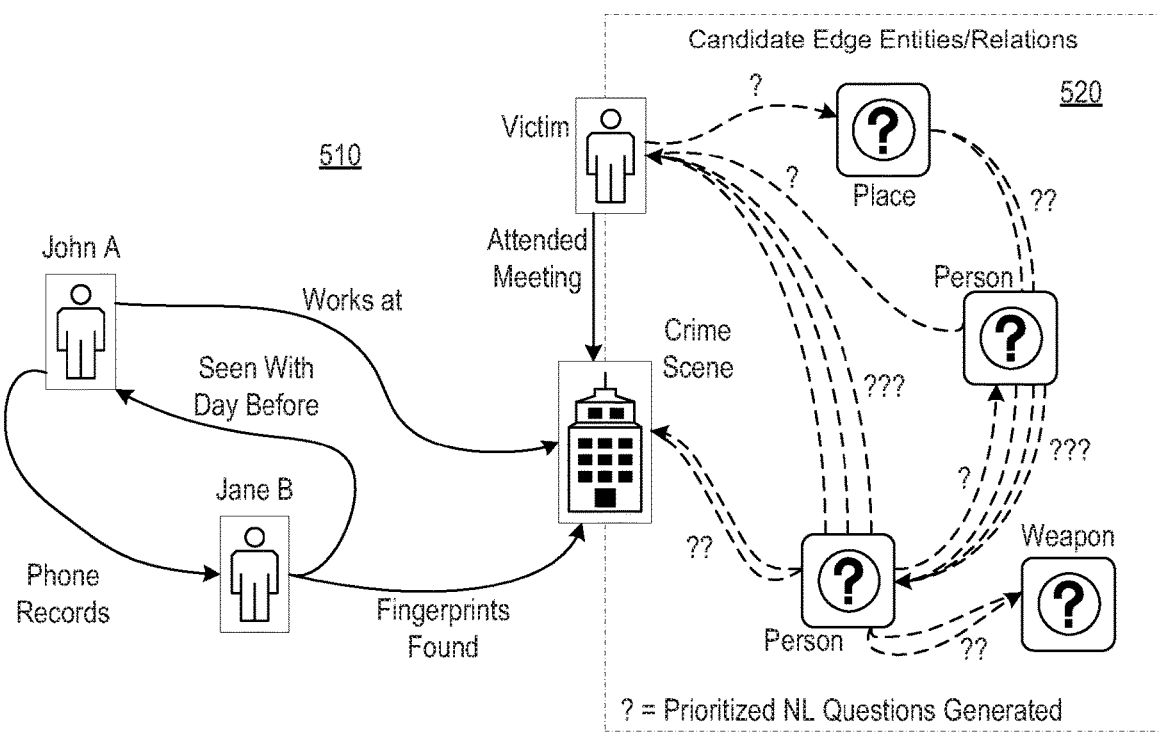
FIGS. 5A-5C illustrate an example of extensions to a knowledge graph being generated using the mechanisms of the illustrative embodiments.
Figure 5B:
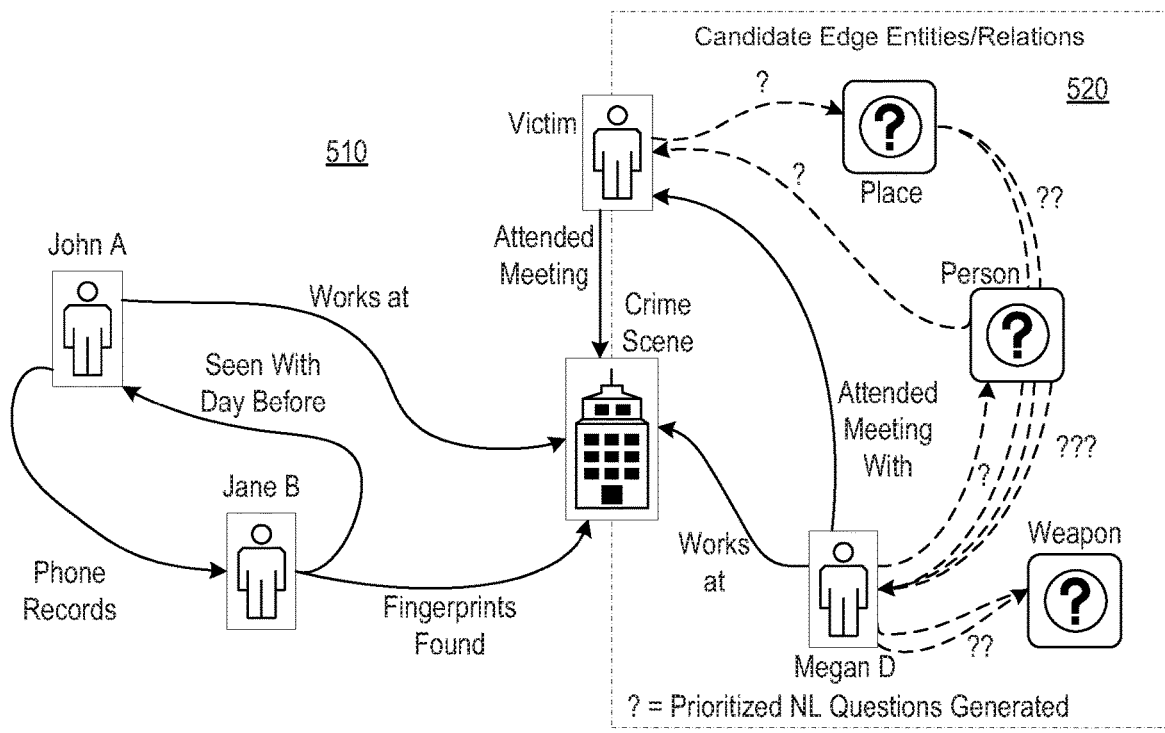
Figure 5C:
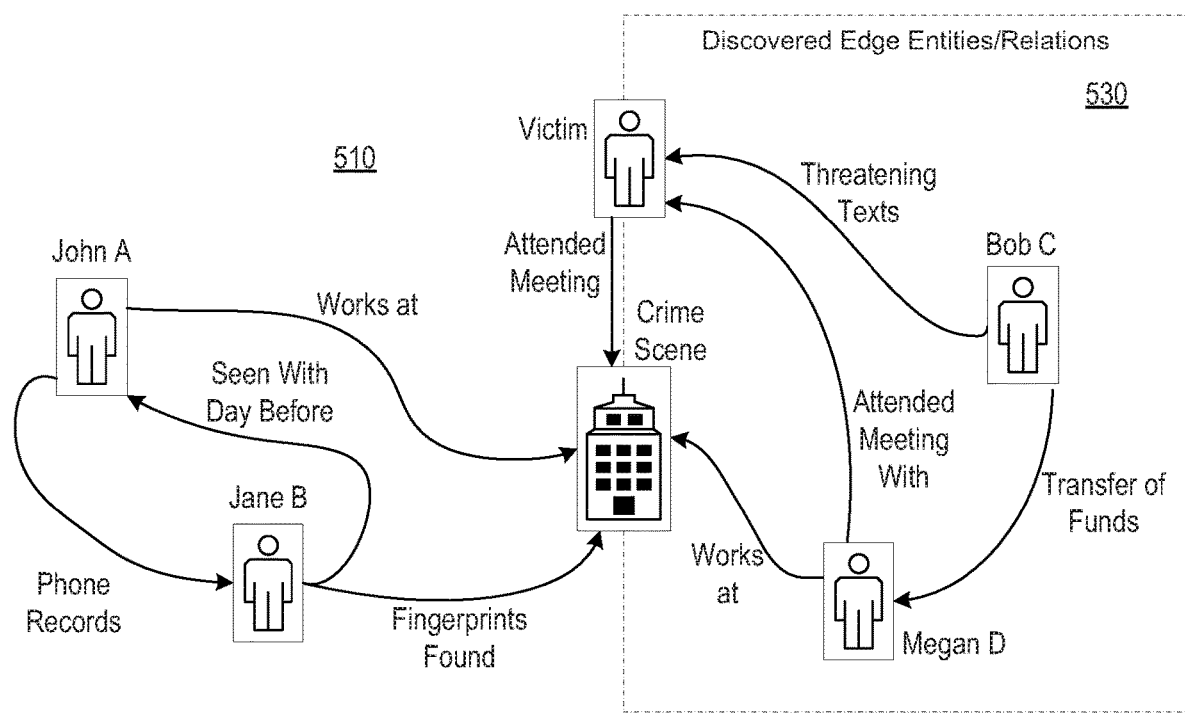

FIGS. 5A-5C illustrate an example of extensions to a knowledge graph being generated using the mechanisms of the illustrative embodiments. FIG. 5A illustrates an initial knowledge graph representation 510 of a criminal investigation that is obtained from data entered into a knowledge base, or corpus, for the particular criminal investigation. The initial knowledge graph representation 510 shows entities with their corresponding relationships as known by the investigator from the information gathered at the crime scene. The right hand side 520 of FIG. 5A illustrates the other potential nodes and relationships that are identified as a result of the operation of the mechanisms of the illustrative embodiments, i.e. the other potential entities and candidate missing edges, representing relationships with these other potential entities. The entities and edges shown in portion 520 are identified by performing the partial matching operation of the right hand side knowledge graph 510 with other knowledge graphs (not shown) for other criminal investigations which have at least a partial match with the knowledge graph 510. Thus, there are a variety of possible relationships with various persons, places, and items (weapon in this example), but the specific instances of these types of entities and types of relationships with regard to the specific edge entities of the knowledge graph 510 are not yet known.

In FIG. 5B, through further operation of the illustrative embodiments, and in particular the generation of natural language questions based on the identified missing edges in 520 of FIG. 5A, it is determined that Megan D is a person that has a "works at" relationship with the crime scene. It is further determined that Megan D has a relationship with the victim of having "attended meeting" with the victim. This information may be gathered through interaction with a user that provides this information and/or through automated analysis of a knowledge base by a cognitive system in response to receiving the generated natural language question. Thus, and extension of the original knowledge graph 510 is generated that encompasses the addition of Megan D and her relationships with the crime scene and the victim.

This process may be performed iteratively on the newly extended knowledge graph which now operates as the original knowledge graph. FIG. 5C illustrates an example of discovered edge entities/relationships 530 which may be discovered by iteratively analyzing candidate missing edges and extending the knowledge graph based on previous extensions of the knowledge graph. For example, through iterative analysis, it may be determined that Bob C has a relationship with Megan D where Bob C transferred funds to Megan D. It may also be determined that Bob C has a relationship with the victim in that Bob C has sent threatening text messages to the victim. Thus, a broader understanding of the criminal investigation is generated through iterative extension of a knowledge graph. It should be noted that not all of the candidate edges and entities shown in the portion 520 in FIG. 5A are included in the final knowledge graph represented in FIG. 5C. Thus, the iterative extension operation may find evidence disproving candidate edges and entities and thus, those candidate edges and entities are discarded.

Figure 6:
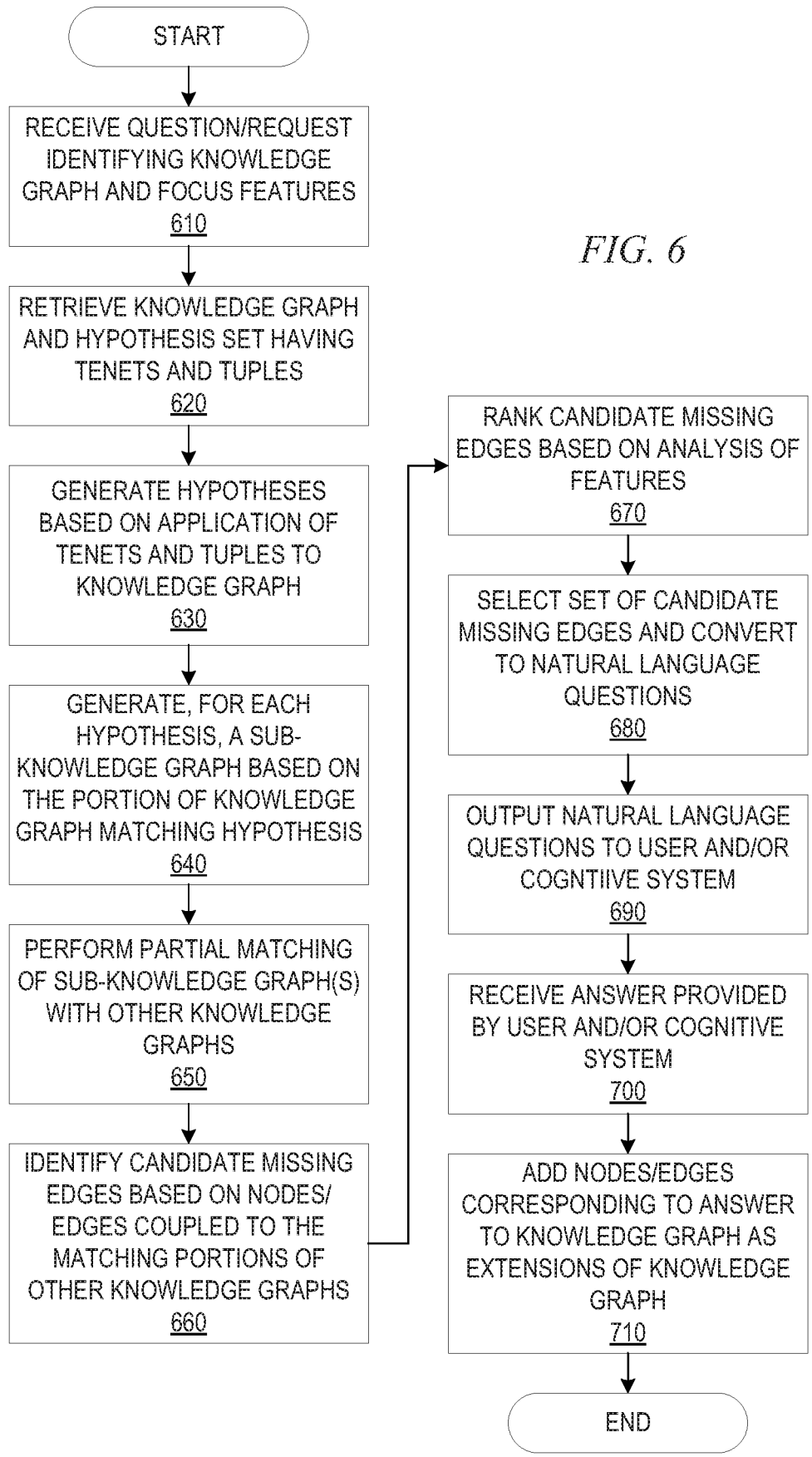
FIG. 6 is a flowchart outlining an example operation of a knowledge graph extension engine in accordance with one illustrative embodiment.

FIG. 6 is a flowchart outlining an example operation of a knowledge graph extension engine in accordance with one illustrative embodiment. As shown in FIG. 6, the operation starts by receiving a question/request identifying a knowledge graph and focus features of the question (step 610). Based on these features, the knowledge graph corresponding to the question is retrieved along with the hypothesis set for the identified focus, which comprises the tenets and tuples for evaluating the hypotheses in the hypothesis set (step 620). The tenets and tuples of the hypothesis set are applied to the knowledge graph to generate specific instances of hypotheses that are specific to the entities and relationships present in the knowledge graph (step 630). For each of these hypotheses, corresponding sub-knowledge graphs are generated from the knowledge graph (step 640).

Partial matching of the sub-knowledge graph(s) is performed with regard to other knowledge graphs to identify other knowledge graphs who have at least a portion of their content matching that of the sub-knowledge graph(s) (step 650). As discussed above, this may be done using entity types, relationship types, as well as direct and indirect matching. Based on the portions of the other knowledge graphs that match the sub-knowledge graph(s), additional edges connecting to nodes of the matching portions are identified as candidate missing edges (step 660). The features of these candidate missing edges are analyzed with regard to predefined criteria, such as may be expressed in the terms of rules, weighting values, equations, and the like, and ranked to thereby prioritize the candidate missing edges as to those that are most likely going to support/refute the corresponding hypothesis (step 670).

A predetermined number of the candidate missing edges are selected for further analysis from the ranked set of candidate missing edges and are converted to natural language questions (step 680). The natural language questions are output to a user and/or cognitive system for answering (step 690). The user may provide an answer to the question(s) and/or the cognitive system may perform question answering operations to automatically generate an answer for the question(s) based on a corpus or corpora of information (step 700). Based on the answers received, new nodes and edges are added to the knowledge graph as extensions of the knowledge graph (step 710) and the operation terminates. It should be appreciated that while FIG. 7 illustrates the operation as terminating at this point, the process may be iterative and may be repeated, such as at step 630, where the newly extended knowledge graph is now the basis for performing the operations set forth in FIG. 6. In this way, an iterative extension of the knowledge graph is performed with each subsequent iteration being performed in a type of fan-out manner from the original knowledge graph.

Thus, the illustrative embodiments provide mechanisms for extending the knowledge represented in a knowledge graph or knowledge base as well as assisting users in identifying areas for further investigation. The illustrative embodiments provide automated mechanisms for assisting with intelligence gathering, especially in cases where the corpus or corpora comprise vast amounts of data. Moreover, patterns learned from other knowledge graphs or knowledge bases may be leveraged to expand upon or extend a current knowledge graph and provide other candidate avenues of investigation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to configure the at least one processor to perform the method, comprising:
   receiving, by the data processing system, a first knowledge graph comprising nodes representing entities and edges between nodes, wherein each edge represents a relationship between the nodes directly connected to each other by the edge;
   identifying, by the data processing system, at least one candidate missing edge connecting at least one node of the first knowledge graph to at least one other node not present in the first knowledge graph;
   evaluating, by the data processing system, the at least one candidate missing edge to determine if the at least one candidate missing edge should be added to the first knowledge graph;
   expanding, by the data processing system, the first knowledge graph to include the at least one candidate missing edge connecting the at least one node to at least one newly added node that is newly added to the first knowledge graph, to thereby generate an expanded knowledge graph, in response to the evaluation indicating that the at least one candidate missing edge should be added to the first knowledge graph; and
   performing, by the data processing system, an operation on the expanded knowledge graph to generate a knowledge output, wherein identifying the at least one candidate missing edge comprises:
      identifying a first pattern of entity types and relationship types between the entities of a subset of the knowledge graph;
      searching a second knowledge graph, different from the first knowledge graph, for a second pattern of entity types and relationship types that match the first pattern; and
      identifying at least one of an other entity or an other relationship, in the second knowledge graph, associated with the matching second pattern that is not part of the first pattern and not part of the matching second pattern, and wherein:

the at least one newly added node is a newly added node having a same entity type as the identified other entity in the second knowledge graph, or the at least one candidate missing edge has a same relationship type as the identified other relationship in the second knowledge graph.

2. The method of claim 1, wherein evaluating the at least one candidate missing edge comprises searching a knowledge base for instances of data corresponding to the at least one other entity or other relationship and which is associated with an entity or relationship present in the first pattern.

3. The method of claim 1, further comprising:

generating at least one question in natural language based on the identified at least one other entity or other relationship associated with the matching second pattern; and outputting the at least one question to one of a human user via a computing device or an automated cognitive system configured to generate an answer to the at least one question.

4. The method of claim 3, further comprising:

receiving an answer to the at least one question from one of the human user via the computing device or the automated cognitive system, wherein expanding the knowledge graph comprises expanding the knowledge graph to include at least one additional node or at least one edge corresponding to the answer to the at least one question.

5. The method of claim 4, wherein the at least one candidate missing edge is an edge, in another knowledge graph, that is connected to a corresponding pattern of entity types and relationship types that at least partially matches the sub-graph, and which is not present in the first knowledge graph.

6. The method of claim 4, wherein searching other knowledge graphs for a corresponding pattern comprises utilizing at least one of explicit matching techniques or implicit matching techniques.

7. The method of claim 1, further comprising:

receiving an input question; and generating a hypothesis for answering the input question based on a predefined tenet data structure, wherein the predefined tenet data structure specifies criteria for proving or disproving the hypothesis, and wherein identifying at least one candidate missing edge comprises:

identifying a first pattern, of entities and relationships between entities, corresponding to the tenet data structure;

identifying a sub-graph in the knowledge graph matching the first pattern;

identifying entity types and relationship types in the sub-graph; and searching other knowledge graphs for a corresponding pattern of entity types and relationship types at least partially matching the sub-graph.

8. The method of claim 7, further comprising:

performing a natural language processing feature extraction operation on the input question to identify a focus of the input question; and retrieving the predefined tenet data structure from a plurality of predefined tenet data structures based on the focus of the input question, wherein the predefined tenet data structure comprises a first set of rules for proving a corresponding hypothesis and a second set of rules for disproving the corresponding hypothesis.

9. The method of claim 8, wherein rules in the first set of rules and the second set of rules are defined as tuples specifying a first entity or entity type, a second entity or entity type, and a relationship or relationship type for linking the first entity or entity type to the second entity or entity type.

10. The method of claim 1, further comprising:

generating a graphical output of the extended knowledge graph, wherein the newly added candidate edge is provided in a visually distinct manner from the first knowledge graph in the graphical output.

11. The method of claim 1, wherein the first knowledge graph represents data collected as part of a first criminal investigation, and wherein the other knowledge graphs represent data collected as part of other criminal investigations.

12. A computer program product comprising a computer readable storage medium having a computer readable program stored therein, wherein the computer readable program, when executed on a computing device, causes the computing device to:

receive a first knowledge graph comprising nodes representing entities and edges between nodes, wherein each edge represents a relationship between the nodes directly connected to each other by the edge;

identify at least one candidate missing edge connecting at least one node of the first knowledge graph to at least one other node not present in the first knowledge graph;

evaluate the at least one candidate missing edge to determine if the at least one candidate missing edge should be added to the first knowledge graph;

expand the first knowledge graph to include the at least one candidate missing edge connecting the at least one node to at least one newly added node that is newly added to the first knowledge graph, to thereby generate an expanded knowledge graph, in response to the evaluation indicating that the at least one candidate missing edge should be added to the first knowledge graph; and perform an operation on the expanded knowledge graph to generate a knowledge output, wherein identifying the at least one candidate missing edge comprises:

identifying a first pattern of entity types and relationship types between the entities of a subset of the knowledge graph;

searching a second knowledge graph, different from the first knowledge graph, for a second pattern of entity types and relationship types that match the first pattern; and identifying at least one of an other entity or an other relationship, in the second knowledge graph, associated with the matching second pattern that is not part of the first pattern and not part of the matching second pattern, and wherein:

the at least one newly added node is a newly added node having a same entity type as the identified other entity in the second knowledge graph, or the at least one candidate missing edge has a same relationship type as the identified other relationship in the second knowledge graph.

13. The computer program product of claim 12, wherein the computer readable program further causes the computing device to evaluate the at least one candidate missing edge at least by searching a knowledge base for instances of data corresponding to the at least one other entity or other relationship and which is associated with an entity or relationship present in the first pattern.

14. The computer program product of claim 12, wherein the computer readable program further causes the computing device to:
generate at least one question in natural language based on the identified at least one other entity or other relationship associated with the matching second pattern; and
output the at least one question to one of a human user via a computing device or an automated cognitive system configured to generate an answer to the at least one question.

15. The computer program product of claim 14, wherein the computer readable program further causes the computing device to:
receive an answer to the at least one question from one of the human user via the computing device or the automated cognitive system, wherein expanding the knowledge graph comprises expanding the knowledge graph to include at least one additional node or at least one edge corresponding to the answer to the at least one question.

16. The computer program product of claim 15, wherein the at least one candidate missing edge is an edge, in another knowledge graph, that is connected to a corresponding pattern of entity types and relationship types that at least partially matches the sub-graph, and which is not present in the first knowledge graph.

17. The computer program product of claim 15, wherein the computer readable program further causes the computing device to search other knowledge graphs for a corresponding pattern at least by utilizing at least one of explicit matching techniques or implicit matching techniques.

18. The computer program product of claim 12, wherein the computer readable program further causes the computing device to:
receive an input question; and
generate a hypothesis for answering the input question based on a predefined tenet data structure, wherein the predefined tenet data structure specifies criteria for proving or disproving the hypothesis, and wherein identifying at least one candidate missing edge comprises:
identifying a first pattern, of entities and relationships between entities, corresponding to the tenet data structure;
identifying a sub-graph in the knowledge graph matching the first pattern;
identifying entity types and relationship types in the sub-graph; and
searching other knowledge graphs for a corresponding pattern of entity types and relationship types at least partially matching the sub-graph.

19. The computer program product of claim 18, wherein the computer readable program further causes the computing device to:
perform a natural language processing feature extraction operation on the input question to identify a focus of the input question; and
retrieve the predefined tenet data structure from a plurality of predefined tenet data structures based on the focus of the input question, wherein the predefined tenet data structure comprises a first set of rules for proving a corresponding hypothesis and a second set of rules for disproving the corresponding hypothesis.

20. The computer program product of claim 19, wherein rules in the first set of rules and the second set of rules are defined as tuples specifying a first entity or entity type, a second entity or entity type, and a relationship or relationship type for linking the first entity or entity type to the second entity or entity type.

21. The computer program product of claim 12, wherein the first knowledge graph represents data collected as part of a first criminal investigation, and wherein the other knowledge graphs represent data collected as part of other criminal investigations.

22. An apparatus comprising:
a processor; and
a memory coupled to the processor, wherein the memory comprises instructions which, when executed by the processor, cause the processor to:
receive a first knowledge graph comprising nodes representing entities and edges between nodes, wherein each edge represents a relationship between the nodes directly connected to each other by the edge;
identify at least one candidate missing edge connecting at least one node of the first knowledge graph to at least one other node not present in the first knowledge graph;
evaluate the at least one candidate missing edge to determine if the at least one candidate missing edge should be added to the first knowledge graph;
expand the first knowledge graph to include the at least one candidate missing edge connecting the at least one node to at least one newly added node that is newly added to the first knowledge graph, to thereby generate an expanded knowledge graph, in response to the evaluation indicating that the at least one candidate missing edge should be added to the first knowledge graph; and
perform an operation on the expanded knowledge graph to generate a knowledge output, wherein identifying the at least one candidate missing edge comprises:
identifying a first pattern of entity types and relationship types between the entities of a subset of the knowledge graph;
searching a second knowledge graph, different from the first knowledge graph, for a second pattern of entity types and relationship types that match the first pattern; and
identifying at least one of an other entity or an other relationship, in the second knowledge graph, associated with the matching second pattern that is not part of the first pattern and not part of the matching second pattern, and wherein:
the at least one newly added node is a newly added node having a same entity type as the identified other entity in the second knowledge graph,
or the at least one candidate missing edge has a same relationship type as the identified other relationship in the second knowledge graph.

* * * * *